J. M. DAPRON.
SAFETY CAR CONTROL DEVICE.
APPLICATION FILED JULY 15, 1919.
1,390,604. Patented Sept. 13, 1921.
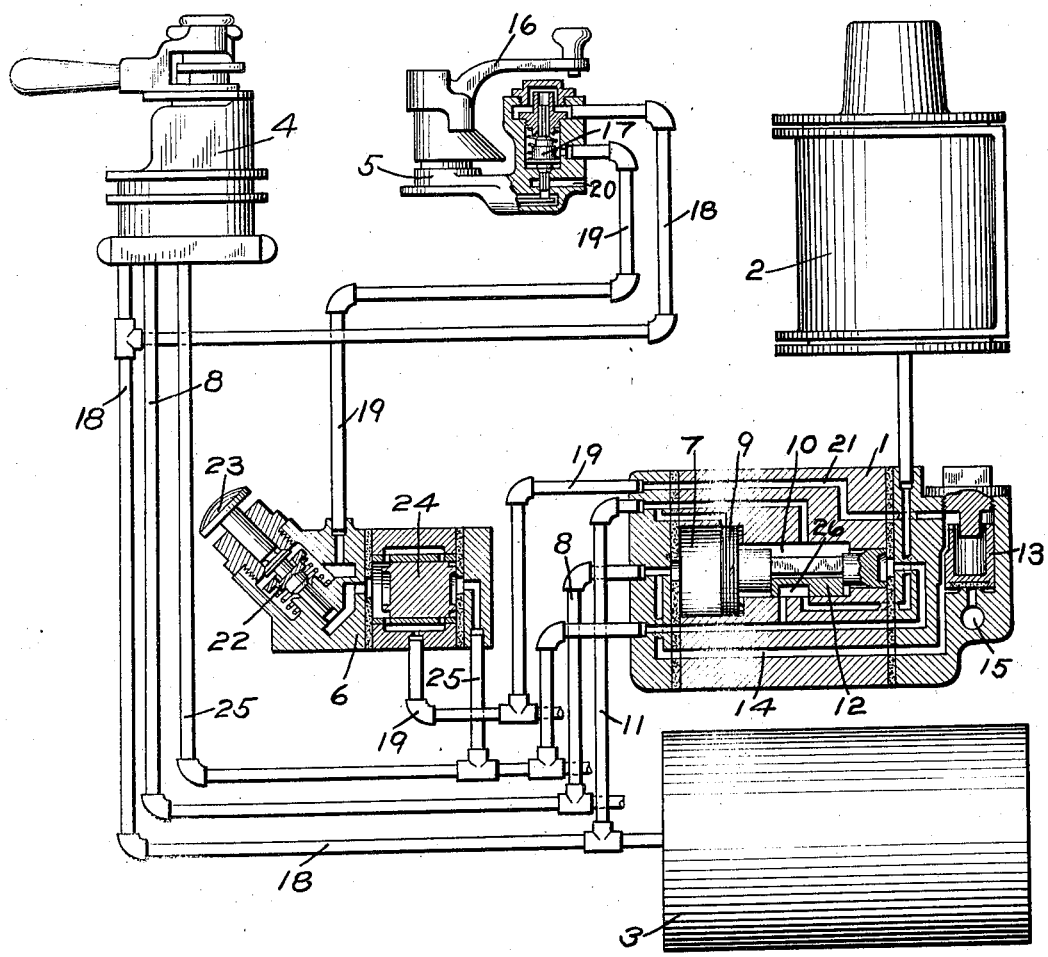
INVENTOR
Joseph M. Dapron
by Wm. M. Cady
Att'y.

UNITED STATES PATENT OFFICE.

JOSEPH M. DAPRON, OF ST. LOUIS, MISSOURI, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL DEVICE.

1,390,604.  Specification of Letters Patent.  Patented Sept. 13, 1921.

Application filed July 15, 1919. Serial No. 311,110.

*To all whom it may concern:*

Be it known that I, JOSEPH M. DAPRON, a citizen of the United States, residing at the city of St. Louis, in the State of Missouri, have invented new and useful Improvements in Safety Car-Control Devices, of which the following is a specification.

This invention relates to fluid pressure brakes, and more particularly to a safety car brake control system.

One of the features of safety car control systems consists in providing means for effecting an emergency application of the brakes in case the motorman removes his hand from the controller handle and it has heretofore been proposed to provide means operated in the event that the motorman makes a straight air application for preventing the operation of the apparatus to effect an emergency application of the brakes when he removes his hand from the controller handle.

If the motorman should make only a light straight air application of the brakes, it is not desirable to prevent the operation of the apparatus to effect an emergency application of the brakes when the motorman removes his hand from the controller handle, as a light straight air application of the brakes may not, under certain circumstances, be adequate to hold the car.

The principal object of my invention is to provide a safety control apparatus of the above character in which an emergency application of the brakes will be automatically effected, if less than a predetermined straight air application of the brakes is made and the motorman should remove his hand from the controller handle.

In the accompanying drawing, the single figure is a diagrammatic view, partly in section, of a safety car control equipment embodying my invention.

As shown in the drawing, the equipment may comprise an emergency valve device 1 of the usual construction, a brake cylinder 2, a main reservoir 3, a brake valve 4, a controller handle 5, adapted to effect an emergency application of the brakes upon removal of the hand from the controller handle, and a combined cut-off and foot valve device 6.

The emergency valve device 1 may comprise a casing, having a piston chamber 7, connected to the brake pipe 8 and containing piston 9, and a valve chamber 10, connected by pipe 11 to main reservoir 3 and containing a slide valve 12. The emergency valve casing also contains a relay valve 13 for venting fluid from the brake pipe 8 through passage 14 to an exhaust port 15.

The controller handle device 5 may comprise a controller handle 16 adapted when depressed to permit the seating of a double beat pilot valve 17 in a direction to supply fluid from main reservoir pipe 18 to the safety control pipe 19 and when the hand is removed from the controller handle to operate said valve so as to vent fluid from the pipe 19 to an exhaust port 20.

The safety control pipe 19 is connected by passage 21 to one side of the relay valve 13 and communication through said safety control pipe is controlled by the combined foot valve and cut-off valve device 6.

The valve device 6 may comprise a double beat valve 22 adapted to be operated by a pedal 23 and a double check valve 24, subject on one side to the pressure in the straight air pipe 25 and adapted to control communication through the safety control pipe 19, communication through said pipe being also controlled by the valve 22.

In operation, fluid is supplied from the main reservoir 3 to the valve chamber 10 of the emergency valve device and with the brake valve 4 in release position, fluid is also supplied to the brake pipe 8 and the piston chamber 7 of the emergency valve device.

With the emergency slide valve 12 in normal release position, as shown in the drawing, if the brake valve 4 is turned to straight air application position, fluid is supplied to the straight air pipe 25 and thence flows through cavity 26 in slide valve 12 to the brake cylinder 2.

Fluid supplied to the straight air pipe 25 also flows to one side of the double check valve 24, but if the controller handle 16 is held depressed, fluid from the main reservoir 3 is supplied from pipe 18 past the double beat valve 17 to pipe 19 and thence to the opposite face of the double check valve 24, so that said valve is held seated in the position shown in the drawing.

If the motorman should remove his hand from the controller handle 16 the double beat pilot valve 17 will be operated so as to vent fluid from the safety control pipe 19 to exhaust port 20 and since the left hand face of the double check valve 24 is open to the pipe 19, fluid is also vented from this face of the double check valve, so that pressure in the straight air pipe acting on the right hand side of the double check valve operates to shift the check valve and thereby cut off communication from the relay valve 13, through the safety control pipe 19 to the pilot valve 17.

Thus the operation of the relay valve 13 by venting fluid therefrom through the safety control pipe will be prevented, but in moving, the double check valve 24 establishes communication from the relay valve side of pipe 19 to the straight air pipe 25.

The opposite side of the relay valve 13 is constantly subject to brake pipe pressure and it will be evident that if the straight air pipe pressure is less than a predetermined degree, the brake pipe pressure will be sufficient to shift the relay valve against the straight air pressure and thus open communication from the brake pipe 8 to exhaust port 15. The reduction in brake pipe pressure thus produced will then cause the operation of the emergency piston 9 by the higher pressure in valve chamber 10, so that the slide valve 12 is shifted to open communication from valve chamber 10 and the main reservoir 3 to the brake cylinder 2, so as to effect an emergency application of the brakes.

On the other hand, if the straight air pressure is high enough, then the relay valve 13 will not be operated.

It will also be noted that if the straight air pressure is thereafter lowered by leakage to a predetermined degree, the relay valve 13 will be operated to effect an emergency application of the brakes.

If the motorman wishes to remove his hand from the controller handle he may prevent an automatic emergency application of the brakes without making a straight air application of the brakes by depressing the pedal 23 which operates the double beat valve 22 to cut off communication from the relay valve 13, through the safety control pipe 19 to the pilot valve 17.

Having now described my invention, what I claim as new, and desire to secure by Letters Patent, is:—

1. In a safety car control equipment, the combination with a relay valve for effecting an emergency application of the brakes, a safety control pipe, and a controller handle device operated upon removal of the hand from the controller handle for venting fluid through the safety control pipe, to operate said relay valve, of a straight air pipe and means operated by straight air pressure for cutting off communication from the relay valve through said safety control pipe to said controller handle device and for opening communication from the relay valve to the straight air pipe.

2. In a safety car control equipment, the combination with a relay valve for effecting an emergency application of the brakes, a safety control pipe, and a pilot valve for venting fluid from the relay valve, through the safety control pipe, of a straight air pipe, and valve means operated by straight air pressure for closing communication from the relay valve through the safety control pipe to the pilot valve and for opening communication from the straight air pipe to the relay valve.

3. In a safety car control equipment, the combination with a safety control pipe through which fluid is vented to effect an emergency application of the brakes, a controller handle, and means operated upon removal of the hand from the controller handle for venting fluid from said safety control pipe, of a straight air pipe and a double check valve operated by straight air pressure for cutting off communication through the safety control pipe to said means and for opening communication from the straight air pipe to the safety control pipe.

4. In a safety car control equipment, the combination with a safety control pipe through which fluid is vented to effect an emergency application of the brakes, a controller handle, and means operated upon removal of the hand from the controller handle for venting fluid from said safety control pipe and adapted when the handle is depressed to supply fluid to said safety control pipe, of a straight air pipe and a double check valve subject on one face to the flow of fluid from said means through the safety control pipe and on the opposite face to the pressure in the straight air pipe, and operated by straight air pressure, when fluid is vented from the safety control pipe by said means for closing communication through the safety control pipe to said means and for opening communication from the straight air pipe to the safety control pipe.

5. In a safety car control equipment, the combination with a relay valve for effecting an emergency application of the brakes, a pilot valve, and a safety control pipe connecting the pilot valve with the relay valve, of a straight air pipe and valve means subject to the pressure in the straight air pipe for controlling communication through the safety control pipe.

In testimony whereof I have hereunto set my hand.

JOSEPH M. DAPRON.